US012627364B2

(12) United States Patent
Soloway et al.

(10) Patent No.: US 12,627,364 B2
(45) Date of Patent: May 12, 2026

(54) SECURITY COMMUNICATOR DUAL ANTENNA SYSTEM

(71) Applicant: Napco Security Technologies, Inc., Amityville, NY (US)

(72) Inventors: Richard L. Soloway, Amitiville, NY (US); Michael A. Carrieri, Amityville, NY (US); Christopher Summit, Amityville, NY (US)

(73) Assignee: Napco Security Technologies, Inc., Amityville, NY (US)

( * ) Notice: Subject to any disclaimer, the term of this patent is extended or adjusted under 35 U.S.C. 154(b) by 523 days.

(21) Appl. No.: 17/894,029

(22) Filed: Aug. 23, 2022

(65) Prior Publication Data

US 2023/0055054 A1     Feb. 23, 2023

Related U.S. Application Data

(60) Provisional application No. 63/236,212, filed on Aug. 23, 2021.

(51) Int. Cl.
*H04B 7/08* (2006.01)
*H01Q 1/24* (2006.01)

(52) U.S. Cl.
CPC ............ *H04B 7/0814* (2013.01); *H01Q 1/246* (2013.01)

(58) Field of Classification Search
CPC .......... H04B 7/08; H04B 7/0814; H01Q 1/24; H01Q 1/246
See application file for complete search history.

(56) References Cited

U.S. PATENT DOCUMENTS

| | | | | | |
|---|---|---|---|---|---|
| 5,568,535 | A | * | 10/1996 | Sheffer | H04W 64/00 |
| | | | | | 379/47 |
| 5,978,483 | A | * | 11/1999 | Thompson, Jr. | H04L 9/0662 |
| | | | | | 380/46 |
| 6,697,641 | B1 | * | 2/2004 | Shapira | H01Q 3/2676 |
| | | | | | 455/562.1 |
| 7,791,452 | B2 | * | 9/2010 | Carrieri | G07C 9/37 |
| | | | | | 340/541 |
| 8,531,337 | B2 | * | 9/2013 | Soler Castany | H01Q 1/242 |
| | | | | | 343/702 |
| 8,577,321 | B2 | * | 11/2013 | Cotterill | H04B 7/0805 |
| | | | | | 343/702 |
| 8,676,254 | B2 | * | 3/2014 | Hedstrom | H04W 40/02 |
| | | | | | 455/553.1 |
| 8,781,442 | B1 | * | 7/2014 | Link, II | H04L 9/30 |
| | | | | | 370/338 |
| 9,112,700 | B2 | * | 8/2015 | Link, II | H04L 9/3297 |
| 9,178,592 | B1 | * | 11/2015 | Djadi | H04B 7/08 |
| 9,462,444 | B1 | * | 10/2016 | Fish | H04M 1/72421 |

(Continued)

FOREIGN PATENT DOCUMENTS

| | | | | | |
|---|---|---|---|---|---|
| EP | 3214714 | A1 | * | 9/2017 | .......... H04B 1/3818 |
| EP | 3343314 | A1 | * | 7/2018 | ......... G08B 13/1418 |

(Continued)

*Primary Examiner* — Hai V Nguyen
(74) *Attorney, Agent, or Firm* — Keith A. Vogt; Keith A. Vogt, Ltd.

(57) ABSTRACT

A fire, burglary or access control security communicator having an antenna switching system and method that is external to the cell module to allow complete switching from a primary to a secondary antenna based on signal strength, error rate or other performance parameters.

18 Claims, 1 Drawing Sheet

(56)                References Cited

U.S. PATENT DOCUMENTS

| | | | | |
|---|---|---|---|---|
| 9,485,116 | B2 * | 11/2016 | Hedstrom | H04W 40/02 |
| 10,165,158 | B2 * | 12/2018 | Carpenter | H04R 1/406 |
| 10,271,766 | B1 * | 4/2019 | Parker, Jr. | A61B 5/0833 |
| 10,516,456 | B1 * | 12/2019 | Fuleshwar Prasad | |
| | | | | B60C 23/0479 |
| 10,819,457 | B1 * | 10/2020 | Alaburda | H04W 84/042 |
| 10,909,830 | B1 * | 2/2021 | Stapleford | H04W 4/90 |
| 10,979,567 | B1 * | 4/2021 | Elam | H04W 4/90 |
| 11,013,064 | B2 * | 5/2021 | Rice | H04B 1/0053 |
| 11,140,581 | B2 * | 10/2021 | Oyman | H04W 28/22 |
| 11,187,223 | B2 * | 11/2021 | Ward | F04B 49/065 |
| 11,296,936 | B2 * | 4/2022 | Johnson | H04L 41/0806 |
| 11,355,857 | B2 * | 6/2022 | McCollough | H01Q 3/446 |
| 11,373,515 | B2 * | 6/2022 | Carrieri | G08B 25/14 |
| 11,382,006 | B2 * | 7/2022 | Chen | H04W 48/18 |
| 11,423,765 | B2 * | 8/2022 | Hess | G08B 29/181 |
| 11,595,110 | B1 * | 2/2023 | Zhan | H04B 7/15535 |
| 11,665,553 | B2 * | 5/2023 | Sistonen | H04W 16/28 |
| | | | | 370/329 |
| 11,729,782 | B2 * | 8/2023 | Zhang | H04W 72/23 |
| | | | | 370/336 |
| 11,764,860 | B2 * | 9/2023 | Zhan | H01Q 1/246 |
| | | | | 370/280 |
| 11,909,585 | B2 * | 2/2024 | Lotter | H04L 41/0803 |
| 12,041,600 | B2 * | 7/2024 | Mueck | H04W 72/52 |
| 12,149,589 | B2 * | 11/2024 | Binder | H04L 67/12 |
| 2003/0203717 | A1 * | 10/2003 | Chuprun | H04B 7/18591 |
| | | | | 455/12.1 |
| 2004/0110534 | A1 * | 6/2004 | Chung | H04W 88/085 |
| | | | | 455/561 |
| 2004/0203577 | A1 * | 10/2004 | Forman | B60R 25/102 |
| | | | | 455/420 |
| 2005/0024202 | A1 * | 2/2005 | Culpepper | H04W 64/00 |
| | | | | 455/456.1 |
| 2005/0075139 | A1 * | 4/2005 | Shapira | H01Q 3/2676 |
| | | | | 455/562.1 |
| 2005/0097046 | A1 * | 5/2005 | Singfield | G06Q 20/1085 |
| | | | | 705/42 |
| 2005/0101314 | A1 * | 5/2005 | Levi | H04L 63/0861 |
| | | | | 348/14.02 |
| 2005/0128989 | A1 * | 6/2005 | Bhagwat | H04L 63/1416 |
| | | | | 370/338 |
| 2006/0214767 | A1 * | 9/2006 | Carrieri | G07C 9/37 |
| | | | | 340/5.5 |
| 2007/0173285 | A1 * | 7/2007 | Hedstrom | H04B 1/3805 |
| | | | | 455/553.1 |
| 2010/0176950 | A1 * | 7/2010 | Bartholf | G07F 9/026 |
| | | | | 340/572.1 |
| 2011/0012726 | A1 * | 1/2011 | Jessiman | G08B 25/08 |
| | | | | 340/501 |
| 2012/0100886 | A1 * | 4/2012 | Man | H01Q 5/20 |
| | | | | 455/550.1 |
| 2013/0121239 | A1 * | 5/2013 | Hicks, III | H04W 4/12 |
| | | | | 370/328 |
| 2013/0207872 | A1 * | 8/2013 | Bakalski | H03H 7/40 |
| | | | | 333/32 |
| 2013/0225229 | A1 * | 8/2013 | Al-Shalash | H04W 24/10 |
| | | | | 455/524 |
| 2014/0104132 | A1 * | 4/2014 | Bakalski | H03H 7/38 |
| | | | | 333/32 |

| | | | | |
|---|---|---|---|---|
| 2014/0179367 | A1 * | 6/2014 | Hedstrom | H04W 88/08 |
| | | | | 455/553.1 |
| 2014/0294180 | A1 * | 10/2014 | Link, II | G08G 1/205 |
| | | | | 380/270 |
| 2015/0156717 | A1 * | 6/2015 | Narasimha | H04W 52/0209 |
| | | | | 370/311 |
| 2016/0285491 | A1 * | 9/2016 | Camello | H04B 1/3822 |
| 2017/0012656 | A1 * | 1/2017 | Hedstrom | H04L 12/5692 |
| 2017/0086281 | A1 * | 3/2017 | Avrahamy | A01G 31/02 |
| 2017/0126940 | A1 * | 5/2017 | Yount | H04N 5/77 |
| 2017/0134104 | A1 * | 5/2017 | Sinisalo | H04B 17/12 |
| 2017/0156124 | A1 * | 6/2017 | Ashley, Jr. | G07C 9/28 |
| 2017/0188199 | A1 * | 6/2017 | Ashley, Jr. | G06V 20/52 |
| 2017/0280338 | A1 * | 9/2017 | Wesby-van Swaay | |
| | | | | H04W 24/02 |
| 2017/0310344 | A1 * | 10/2017 | Lee | H04B 1/006 |
| 2018/0062726 | A1 * | 3/2018 | Waight | H04L 27/0014 |
| 2018/0115686 | A1 * | 4/2018 | Carpenter | G11B 27/10 |
| 2018/0278693 | A1 * | 9/2018 | Binder | H04L 67/12 |
| 2019/0069127 | A1 * | 2/2019 | Marko | H04W 76/50 |
| 2019/0104539 | A1 * | 4/2019 | Park | H04W 72/23 |
| 2019/0215729 | A1 * | 7/2019 | Oyman | H04L 65/1016 |
| 2019/0254013 | A1 * | 8/2019 | Chang | H04L 5/00 |
| 2019/0281588 | A1 * | 9/2019 | Zhang | H04W 52/08 |
| 2019/0320488 | A1 * | 10/2019 | Mildh | H04W 76/27 |
| 2019/0353156 | A1 * | 11/2019 | Ward | F04B 49/065 |
| 2019/0355145 | A1 * | 11/2019 | Bruner | H04W 4/38 |
| 2019/0373511 | A1 * | 12/2019 | Oyman | H04W 76/27 |
| 2020/0017131 | A1 * | 1/2020 | Houghton | B61L 27/70 |
| 2020/0068354 | A1 * | 2/2020 | Stapleford | H04W 4/029 |
| 2020/0119784 | A1 * | 4/2020 | Lu | H04B 7/0456 |
| 2020/0307614 | A1 * | 10/2020 | Jordan | H04W 4/12 |
| 2020/0325703 | A1 * | 10/2020 | Strang | E05B 67/36 |
| 2020/0342746 | A1 * | 10/2020 | Hess | G08B 25/10 |
| 2020/0388922 | A1 * | 12/2020 | Téllez | H01Q 13/103 |
| 2020/0404069 | A1 * | 12/2020 | Li | H04L 67/59 |
| 2021/0120462 | A1 * | 4/2021 | Chen | H04W 8/02 |
| 2021/0152976 | A1 * | 5/2021 | Daoura | H04W 52/0254 |
| 2021/0360710 | A1 * | 11/2021 | Höglund | H04W 74/0858 |
| 2022/0042504 | A1 * | 2/2022 | Ward | F04B 49/065 |
| 2022/0046478 | A1 * | 2/2022 | Oyman | H04W 28/22 |
| 2022/0123570 | A1 * | 4/2022 | Fuchs | H02J 7/82 |
| 2022/0132524 | A1 * | 4/2022 | Mueck | H04W 72/1215 |
| 2022/0177295 | A1 * | 6/2022 | McNicholas | G08C 19/00 |
| 2022/0209846 | A1 * | 6/2022 | Harrington | H04B 7/1856 |
| 2022/0231718 | A1 * | 7/2022 | Stewart | H05K 7/202 |
| 2022/0255572 | A1 * | 8/2022 | Huo | H04B 1/04 |
| 2022/0279392 | A1 * | 9/2022 | Chen | H04W 36/0072 |
| 2022/0405340 | A1 * | 12/2022 | Kirkwood | G06F 16/904 |
| 2023/0012113 | A1 * | 1/2023 | Pearson | B62J 19/00 |
| 2023/0299484 | A1 * | 9/2023 | Chang | H01Q 1/2266 |
| 2023/0300590 | A1 * | 9/2023 | Li | H04W 4/90 |
| | | | | 455/404.1 |
| 2023/0362947 | A1 * | 11/2023 | Zhang | H04W 52/242 |
| 2024/0203234 | A1 * | 6/2024 | Hess | G08B 29/181 |
| 2024/0297771 | A1 * | 9/2024 | Li | H04B 17/328 |
| 2024/0297773 | A1 * | 9/2024 | Huang | H04L 5/001 |
| 2024/0298194 | A1 * | 9/2024 | Mueck | G06N 20/00 |

FOREIGN PATENT DOCUMENTS

| | | | | | |
|---|---|---|---|---|---|
| EP | | 3367564 | B1 * | 3/2021 | H03F 1/0211 |
| GB | | 2281012 | A * | 2/1995 | H04B 7/0408 |
| WO | WO-2020123608 | A1 * | | 6/2020 | G07C 5/008 |
| WO | WO-2022020830 | A1 * | | 1/2022 | H04W 88/06 |

* cited by examiner

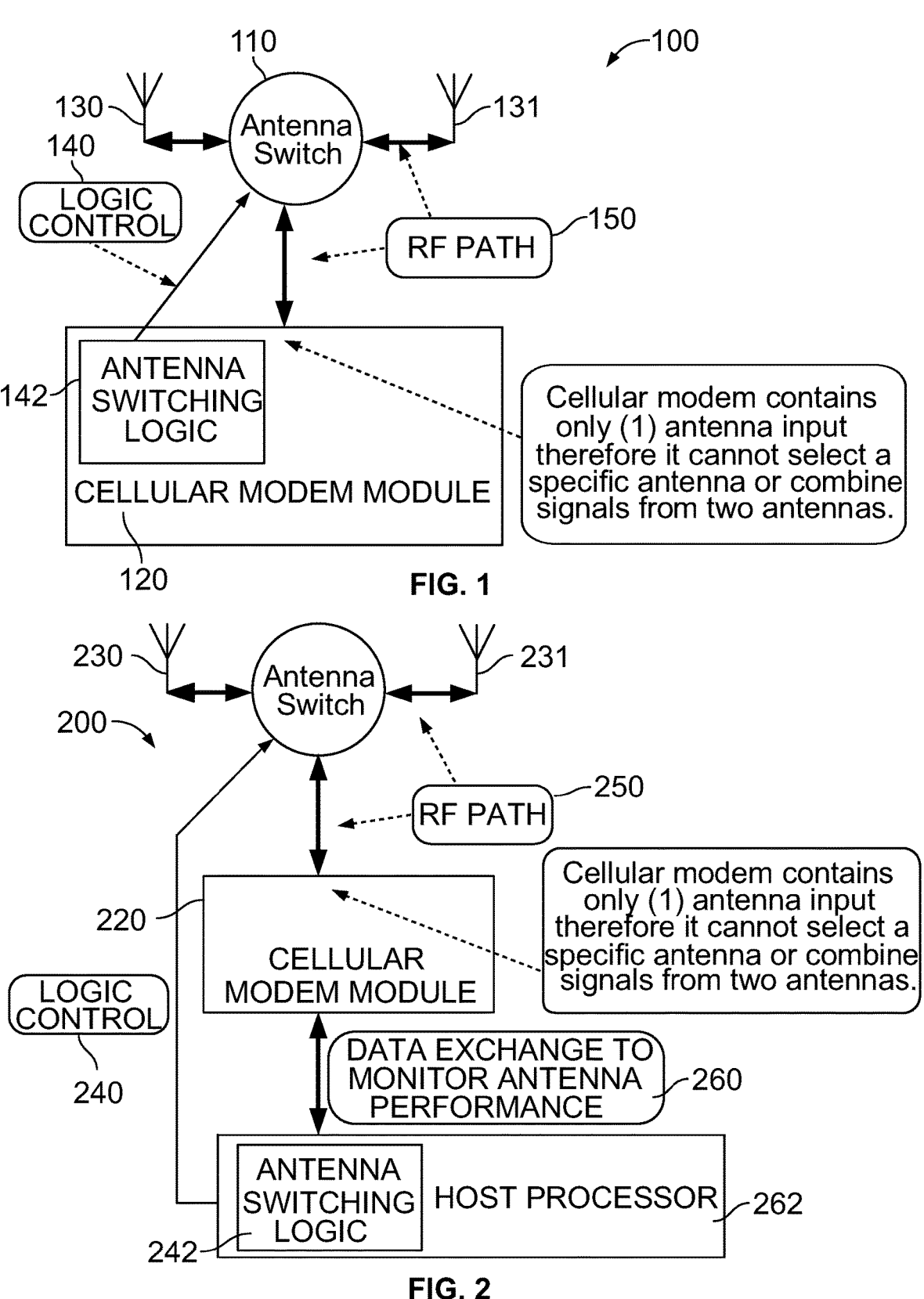

110

130

131

140

LOGIC CONTROL

RF PATH 150

142 ANTENNA SWITCHING LOGIC

CELLULAR MODEM MODULE

120

100

Cellular modem contains only (1) antenna input therefore it cannot select a specific antenna or combine signals from two antennas.

RF PATH 250

220

LOGIC CONTROL

240

CELLULAR MODEM MODULE

Cellular modem contains only (1) antenna input therefore it cannot select a specific antenna or combine signals from two antennas.

DATA EXCHANGE TO MONITOR ANTENNA PERFORMANCE 260

242 ANTENNA SWITCHING LOGIC

HOST PROCESSOR 262

FIG. 2

SECURITY COMMUNICATOR DUAL ANTENNA SYSTEM

RELATED APPLICATIONS

This application claims priority to U.S. Provisional Application No. 63/236,212, filed on Aug. 23, 2021, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

RF radio transmissions often create nulls or other signal suppressing reflections which affect the ability to properly transmit or receive signals targeted to a single antenna. Antenna diversity is often used whereby there are multiple receive/transmit antennas spaced a distance apart so that a null on one antenna can be avoided by using another antenna.

Cell tower communications standards, such as the 3GPP specification, have defined antenna configurations such as MIMO (multiple in and multiple out) and MISO (multiple in single out) where multiple antennas can be used to improve throughput by doing simultaneous reception (multiple in) but also provide avoidance of or minimization of nulls. Typically, the signals from two antennas are blended together. Cell phones typically have multiple antennas but have trouble obtaining true diversity because they cannot space the antennas far enough apart, according to scientific wavelength calculations, in their small housing size. However, a cell phone user can easily turn or move to improve reception, which is like having a wider spacing between antennas.

Technologies such as 2G and 3G all utilized single antennas as defined by the 3GPP standards and implemented by the manufacturers of cell modems. The 4G LTE (long term evolution) network was developed to support multiple antennas in MIMO and MISO configurations. These configurations have active circuitry in the cell modules that either combines two weak signals together or provides two totally independent inbound streams for speed and reception enhancement. However, LTE Category M (CAT-M) and NBIoT standards required increased receiver sensitivity in place of multiple antenna technology as a means to reduce cost. As a result, CAT-M or NBIoT cell modules have only a single antenna port for cell based communication.

Cellular radio communication devices installed in, in use of, or connected to fire, burglary and access control systems, which are fixed to a specific location, such as being mounted on a wall, are not movable. Thus, if a low signal condition occurs, there is no automatic method to resolve the problem. This low signal condition could occur because of environmental changes, such as the equipment being moved near the radio or an obstruction blocking the signal, such as a large truck, which could introduce new null patterns which were not present at the time the radio was installed. Even leaves on trees that were not there in the winter, but grew in the summer, could create a low signal condition.

Also, fire alarms with their cell radios are typically mounted on ground floors in buildings and remain fixed in-place. This makes the system susceptible to a degradation of reception and propagation signals as a result of unforeseen changes. For example, other building may be constructed that disrupt or degrade cellular communications. Even the growth of trees of long periods of time may degrade cellular communication Thus, as will be discussed in further detail below, the dual diversity radio antennas of the present invention improve communications of critical systems such as fire, intrusion, security and medical alarm systems.

BRIEF SUMMARY OF THE INVENTION

In one embodiment, the present invention provides a fire, burglary or access control security communicator having an antenna switching system and method that is external to the cell module to allow complete switching from a primary to a secondary antenna based on signal strength, error rate or other performance parameters.

In another embodiment, the present invention provides a communicator having an antenna switching system that does not require direct support from the cell module manufacturer and can be applied to any cell module.

In another embodiment, the present invention provides a communicator having an antenna switching system capable of isolating an inoperable antenna in the system.

In another embodiment, the present invention provides a communicator having an antenna switching system deploying antennas with differing polarizations.

In another embodiment, the present invention provides a communicator having an antenna switching system deploying antennas with vertical and horizontal polarizations.

In another embodiment, the present invention provides a communicator having an antenna switching system that adaptively selects for use an antenna having the best polarization at the time.

In another embodiment, the present invention provides a communicator having an antenna switching system deploying antennas pointed in different directions.

In another embodiment, the present invention provides a communicator having an antenna switching system deploying antennas using different directional antennas.

In another embodiment, the present invention provides a communicator having an antenna switching system deploying antennas adapted to receive signals from different sources.

In another embodiment, the present invention provides a fire alarm having an antenna switching system deploying antennas adapted to receive signals from different cell towers.

In another embodiment, the present invention provides a communicator having an antenna switching system that tests and receives on that same channel.

In another embodiment, the present invention provides a communicator having an antenna switching system that does not alter the receive bands of the diversity antenna.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1 shows a communication system having an antenna switching mechanism external to the cell module.

FIG. 2 shows a second embodiment of the communication system having an antenna switching mechanism external to the cell module.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

As shown in FIG. 1, the present invention provides communication system 100, such as a security, fire, intrusion and medical alarm system, having an antenna switching mechanism 110 external to the cell module 120 to allow complete switching between two or more antennas 130 and 131via RF path 150 based on signal strength, error rate or other performance parameters. In a preferred embodiment, switching is between a primary and a secondary antenna that result in an optimal feed being provided to cellular modem 120.

The embodiments of the present invention do not require direct support from the cell module manufacturer. The embodiments of the present invention may also be applied to any cell module. Moreover, the present invention is adapted for use with cellular modems having a single input which cannot select a specific for use or combine signals from multiple antennas.

Also provided is logic control 140 and antenna switching logic 142 which may be embedded in system 100. Logic control 140 and antenna switching logic 142 are used to determine which antenna in the system is used to feed a signal to cellular modem 120. This allows each antenna used in the system to be isolated from the other antennas via switch 110. Thus, damaged, or inoperable antennas may be isolated from the others. Thus, if one antenna is damaged or in a short circuit condition, it will not affect the ability of the other antennas to function since the system has the ability to switch between an undesired antenna to a desired antenna.

FIG. 2 shows a second embodiment of the present invention providing communication system 200, such as a security, fire, intrusion and medical alarm system, having an antenna switching mechanism 210 external to the cell module 220 to allow complete switching between a plurality of antennas 230-231 via RF path 250 based on signal strength, error rate or other performance parameters. In a preferred embodiment, switching is between a primary and a secondary antenna that result in an optimal feed being provided to cellular modem 120.

Also provided is logic control 240 and antenna switching logic 242 which may be embedded in system 200. Logic control 240 and antenna switching logic 242 are used to determine which antenna in the system is used to feed a signal to cellular modem 220. This allows each antenna used in the system to be isolated from the other antennas via switch 220. Thus, damaged, or inoperable antennas may be isolated from the others. Thus, if one antenna is damaged or in a short circuit condition, it will not affect the ability of the other antennas to function since the system has the ability to switch between an undesired antenna to a desired antenna.

As further shown in FIG. 2, cellular modem 220 and antenna switch logic 242 may be adapted and connected to enable data exchange 260 therebetween to monitors antenna performance. Processor 262 may be used to enable an operate logic control 240 and antenna switch logic 242 as well as data exchange 260.

In other embodiments, the antennas of the fire alarm may have different polarizations. For example, one or more antennas can he vertically polarized, and the others horizontally polarized to allow transmission and reception from the best polarization at the time.

In other embodiments, the direction and type of antenna used with the fire alarm may vary. For example, one antenna can be pointed (if using a directional antenna such as a Yagi) to one cell tower and the second antenna pointed to another tower to provide tower redundancy.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A communication system comprising:
a single RF feed input, a sole cellular modem having a simple RF feed Input and a single RF feed output, and switch having a single RF feed input and a plurality of RF feed outputs, each of said plurality of RE feed outputs of said switch connected to a single antenna;
said sole cellular modem receives said single RF feed input prior to said switch receiving said RF feed input at said single RF feed input of said sole cellular modem;
said switch located between said sole cellular modem and said plurality of said antennas, said switch directly connected to said plurality of antennas;
said cellular modem does not directly send said RE feed to any of said plurality of antennas and is not directly connected to said antennas; and
after said switch receives said single RF feed input at said single fed RE input of said switch, said switch adapted to use said single RE feed output of said switch to connect said single RF feed input to one of said plurality of antennas.

2. The system of claim 1 further including a processor, said processor adapted to connect one of said plurality of antennas to said input of said cellular modem based upon said connected antenna having an optimal performance parameter compared to other of said plurality of antennas.

3. The system of claim 2 wherein said performance parameter is signal strength.

4. The system of claim 2 wherein said performance parameter is error rate.

5. The system of claim 2 wherein said processor uses logic control to select one of said plurality of antennas to said input of said cellular modem.

6. The system of claim 2 wherein said processor uses antenna switching logic to select one of said plurality of antennas to said input of said cellular modem.

7. The system of claim 2 wherein said processor uses logic control and antenna switching logic to select one of said plurality of antennas to said input of said cellular modem.

8. The system of claim 2 wherein said processor receiver antenna performance data from a cellular modem.

9. The system of claim 2 wherein said processor receiver antenna signal strength data from a cellular modem.

10. The system of claim 2 wherein said processor receiver antenna error rate data from a cellular modem.

11. The system of claim 1 further adapted to receive antenna performance data from said cellular modem.

12. The system of claim 1 further adapted to receive antenna signal strength data from said cellular modem.

13. The system of claim 1 further adapted to receive antenna error rate data from a cellular modem.

14. The system of claim 1 further adapted to isolate an inoperable antenna in the system.

15. The system of claim 1 wherein said antennas have differing polarizations.

16. The system of claim 1 wherein said antennas one of said antennas has a vertical polarization and another of said antennas has a horizontal polarization.

17. The system of claim 1 having different directional antennas.

18. The system of claim 1 wherein said modem cannot select a specific antenna or combine signals from two or more antennas.

* * * * *